United States Patent
Hikida et al.

[15] 3,693,765
[45] Sept. 26, 1972

[54] DISC BRAKE AND SQUEAL PREVENTIVE MEANS THEREFOR

[72] Inventors: Ryotaro Hikida; Takeo Ogasawara, both of Nagoya, Japan

[73] Assignee: Kabushiki Kaisha Toyota Chuo Kenkyusho, Uichi-ken, Japan

[22] Filed: May 1, 1970

[21] Appl. No.: 33,824

[30] Foreign Application Priority Data

May 8, 1969 Japan.....................44/35857

[52] U.S. Cl..............188/73.5, 188/72.5, 188/205 A
[51] Int. Cl...........................................F16d 55/228
[58] Field of Search..........188/72.2, 73.5, 72.4, 72.5, 188/205 A, 240 B

[56] References Cited

UNITED STATES PATENTS

| 2,768,710 | 10/1956 | Butler | 188/72.5 |
| 3,224,532 | 12/1965 | Simon | 188/72.5 X |
| 3,429,405 | 2/1969 | Frigger | 188/73.5 X |
| 3,490,563 | 1/1970 | Hahm | 188/73.5 |
| 2,245,987 | 6/1941 | Lambert | 188/72.2 |
| 3,422,933 | 1/1969 | Van House et al. | 188/72.2 |

FOREIGN PATENTS OR APPLICATIONS

| 1,390,274 | 1/1965 | France | 188/72.2 |
| 1,253,968 | 11/1967 | Germany | 188/72.4 |

*Primary Examiner*—George E. A. Halvosa
*Attorney*—Berman, Davidson and Berman

[57] ABSTRACT

The invention relates to disc brakes wherein antifriction intermediate members such as rollers, or balls, are provided between the friction pad and the piston reducing the contact area to lines or dots, thereby reducing the frictional force between opposed surfaces of the pad and the piston, to prevent brake squeal.

7 Claims, 12 Drawing Figures

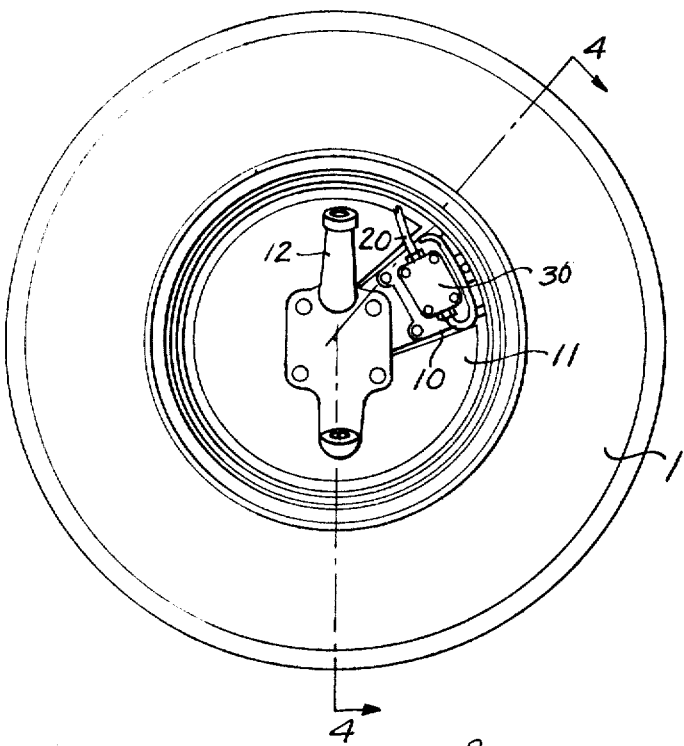
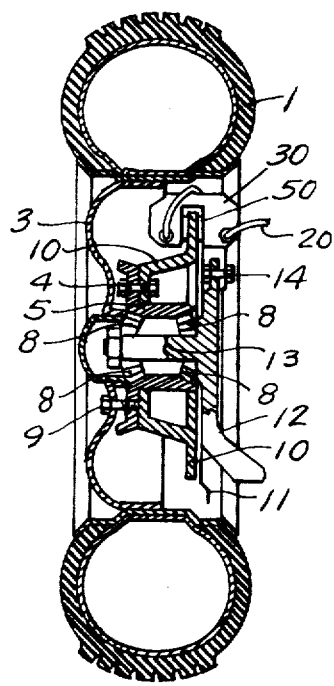
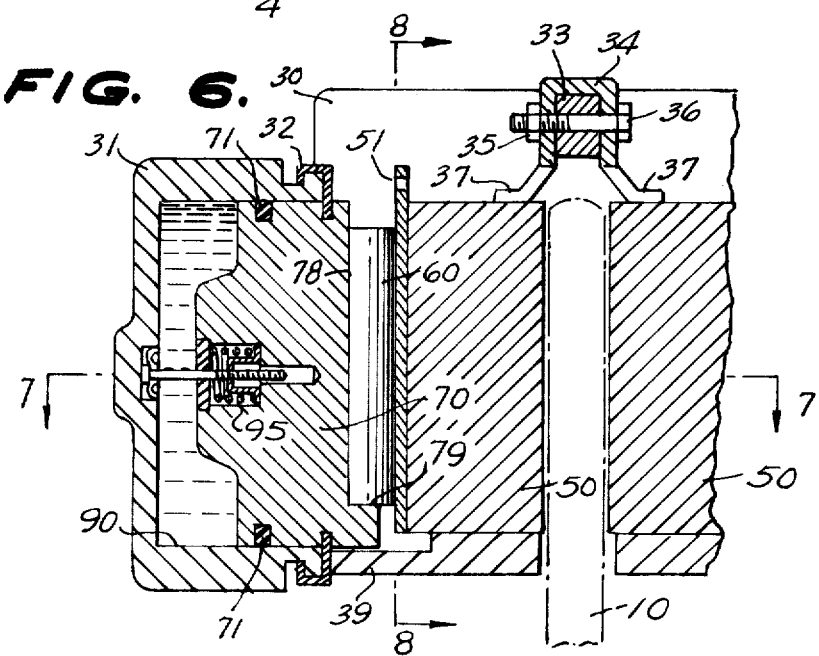

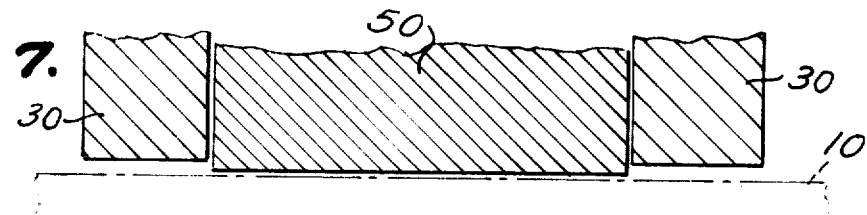
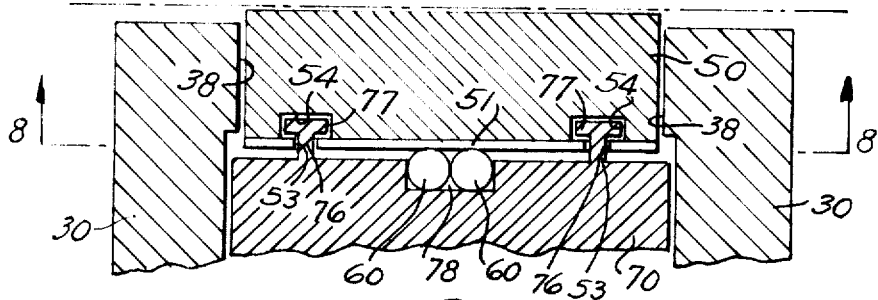
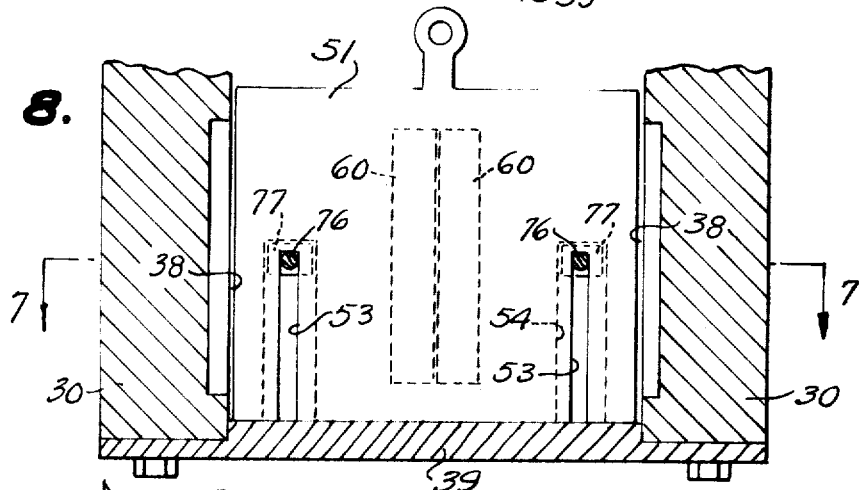
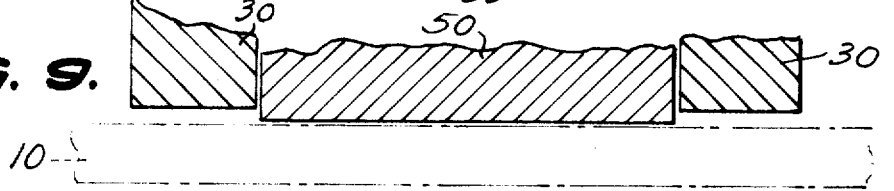
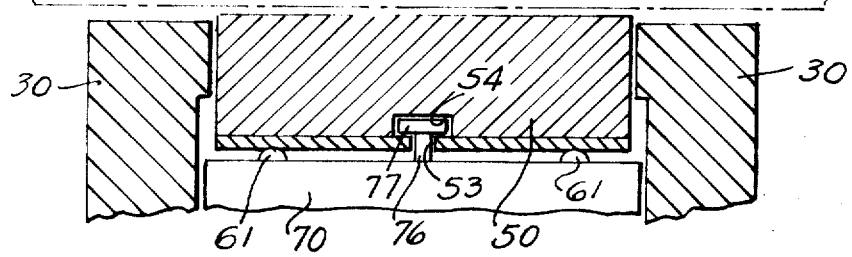

INVENTORS.
RYOTARO HIKIDA,
TAKEO OGASAWARA,
BY
Berman, Davidson & Berman,
ATTORNEYS.

DISC BRAKE AND SQUEAL PREVENTIVE MEANS THEREFOR

BACKGROUND OF THE INVENTION

This invention relates to a disc brake, and more particularly to improvements in a disc brake adapted to prevent the occurrence of unpleasant brake squeal.

It has been known heretofore that the occurrence of brake squeal is greatly influenced by the nature of the friction pad and lining materials. Thus, it has been thought that the principal cause of brake squeal lies in the frictional properties of materials rubbing against each other, and many studies have been made and their results put into practice to improve the pad and lining materials without completing avoiding, or materially damping the squeal.

This invention relates to improvements in a disc brake which eliminates brake squeal and which has been gained by analyzing the results of experiments concerning the phenomenon of brake squeal from the standpoint of elasticity engineering and the science of oscillation. The resultant brake of this invention is fundamentally different from any brake of the past.

When the movements and elasticity displacements of every part of the brake system are minutely measured at the time of occurrence of brake squeal, very complicated oscillations are found in the system. However, since the frequency of brake squeal is in the order of kilocycles, it can be said that the principal cause of occurrence of brake squeal are the oscillations which are caused by the inter-action of piston, pad, caliper and disc if the low frequency oscillations are excluded.

To completely eliminate undesirable oscillations and brake squeal, the present invention contemplates making the opposed surfaces of the friction pad and the piston parallel to the rotating face of the brake disc, and interposing an intermediate member, or members such as cylindrical and semicylindrical rollers, balls, or spheres or semi-spheres having an arcuate surface which touches either of the opposed surfaces of the piston and pad. The arcuate surface of the intermediate member greatly reduces the friction at the area of surface contact and as a result, greatly reduces the forces tending to set up the undesirable oscillations which result in brake squeal.

It is a primary object of the present invention to provide disc brakes in which brake squeal is prevented.

It is another object of the present invention to provide disc brakes in which brake squeal is prevented for a long time.

It is a further object of the present invention to provide means for preventing brake squeal which can be applied to conventional disc brakes.

It is still further object of the present invention to provide means for keeping the frictional force between the pad and the piston small for a long time.

It is a still further object of the present invention to provide disc brakes wherein an intermediate member having, at least partially, an arc-like surface provided between opposed surfaces of the piston and the pad.

BRIEF DESCRIPTION OF THE DRAWINGS

The novel features that are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts throughout the several Figures, and in which:

FIGS. 3 to 8 show the first embodiment of this invention;

FIG. 3 is an elevational view of a car wheel equipped with a disc brake;

FIG. 4 is a cross-sectional view taken along line 4—4 of FIG. 3;

FIG. 5 is a plan view of the dis brake alone;

FIG. 6 is a vertical sectional view taken along line 6—6 of FIG. 5;

FIG. 7 is a partly broken horizontal section of a disc brake taken along line 7—7 of FIG. 6;

FIG. 8 is a partly broken cross-sectional view along line 8—8 of FIG. 5;

FIG. 9 is a partly broken horizontal section of the disc brake showing the principal part of the second embodiment of this invention;

FIG. 10 is a partly broken cross-sectional view of the pad and the piston opposed to each other taken along line 10—10 of FIG. 11;

FIG. 11 is a partly broken front view of the piston along line 11—11 of FIG. 10;

FIG. 12 is a cross-sectional view of the principal part ( in which a plate 67 has been taken away) along line 12—12 of FIG. 10

Figure 1:
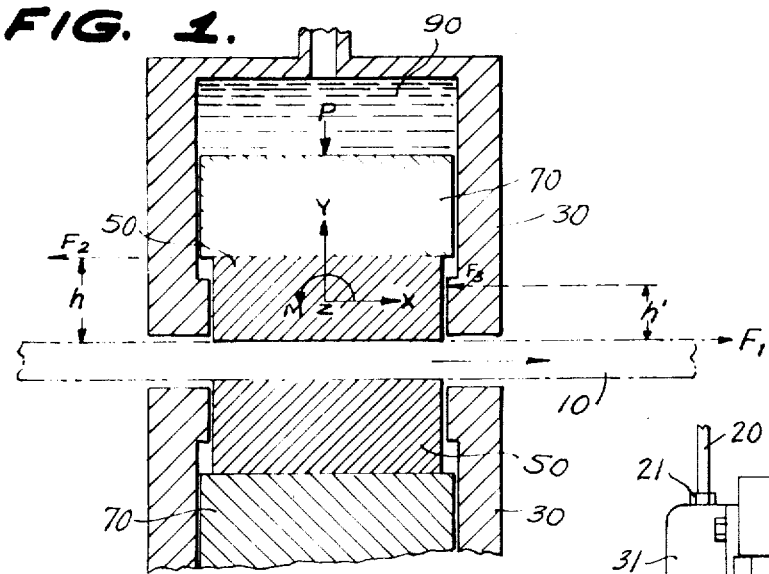
FIG. 1 is a diagram showing the principal of operation of a disc brake.
Figure 5:
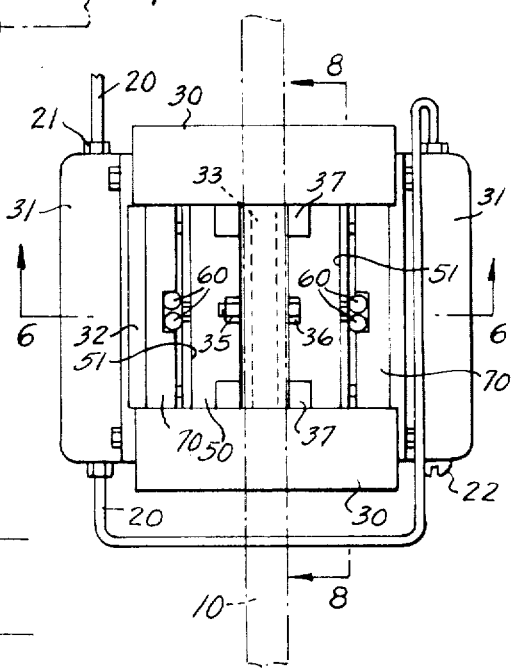

The principal of operation of a brake may be considered with respect to FIG. 1. When piston 70 is pressed by the force P of oil 90 during braking so that the friction pad 50, touching the top face of the piston 70, is pressed against the rotating disc 10, the frictional force $F_1$ takes place between the pad 50 and disc 10 and the frictional force $F_2$ acts between the pad 50 and the piston 70. If the frictional force $F_1$ becomes larger than the frictional force $F_2$, pad 50 moves in the direction X (direction of friction) and touches caliper 30, crossing the normal gap of about 0.1 mm. between caliper 30 and pad 50 during nonbraking. In this condition, the counter force $F_3$ acts from caliper 30 to pad 50 and when pad 50 does not vibrate, the sum of frictional force $F_2$ and counter-force $F_3$ equals the frictional force $F_1$.

Applicants conducted various experiments to measure the strain of the pad and its oscillatory signals in the direction of X,Y (vertical to the disc) and Z (vertical to both X and Y) of a pad 50 such as shown in FIG. 1, by using strain gauges and, at the same time, measuring the changes of brake oil pressure and its oscillatory signal and the oscillatory signal of the brake squeal.

Figure 2:
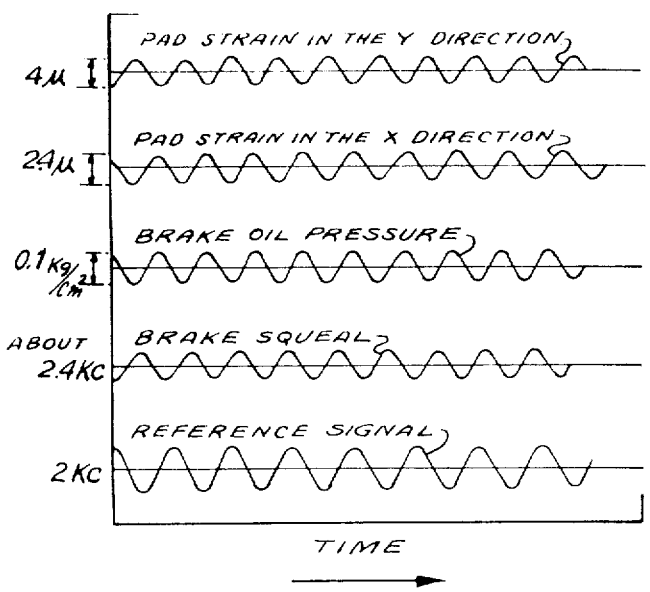
FIG. 2 is a diagram of oscillatory signals of the pad strain, brake oil pressure, and brake squeal compared with a reference signal in a disc brake.

A part of the measurement data is shown in FIG. 2 together with the reference signal of 2 kilocycles, wherein time is shown as the abscissa, and the amplitudes of the oscillatory signals of the pad strain in the X and Y direction, the brake oil pressure and the brake squeal as ordinates.

As will appear from FIG. 2, the frequency of each signal representing pad strain in the Y and X directions and the brake oil pressure is about 2.4 kilocycles, which is almost the same as the 2.4 kilocycles found to be the frequency of brake squeal. It thus became apparent that the oscillations of the friction pad and oil cylinder parts are the cause of brake squeal. In the above measurements the oscillation amplitude of pad strain in the Y direction was about 4 microns, and the oscillation amplitude of the brake oil pressure about 0.1 kg/cm².

Considering with the above-mentioned data, the results of various other experiments, it was found that the pad 50 as a whole vibrated mainly in the directions of X and Y and only a little in the direction of Z; that the pad turned around the axes X, Y and Z and that the pad bent around the axis Z. The pad was in compression in the Y direction and was subjected to shearing forces in the X direction.

Further experiments were carried out changing the form, rigidity and supporting point of the pad. As a result, it was found that the combination of oscillations of the pad in the directions of X and Y and the rotation and bending oscillations around the Z axis are the principal causes of brake squeal, and that other oscillations only have secondary influence, especially the oscillation in the Y direction does not combine with the oscillation in X direction, directly, but the rotating and bending oscillations around the Z axis combine with the oscillation in Y direction directly to yield the moment $M = F_2 h + F_3 h'$ (where $h$ is the thickness of the pad 50 and $h'$ is the interval between the acting line of counter-force $F_3$ and the disc surface), and some combination modes make the frictional self-sustained oscillations take place.

By making the frictional force $F_2$ of piston and pad small, and by making $h'$ smaller, letting the supporting point of the pad approach the disc, it was found that these combined oscillations were alleviated and the moment $F_2 h$ and $F_3 h'$ became small.

Based upon the mentioned experiments and analysis, and aiming at the decrease of frictional force of $F_2$ between piston and pad, Applicants continued the experiments and found that the occurrence of bending oscillation of the pad can be decreased greatly by not only decreasing the abovementioned frictional force $F_2$, but also by decreasing the touching surface area of the piston and the pad, so as to prevent brake squeal even more effectively. This was accomplished by inserting intermediate members such as cylinders, or semicylinders, balls, or spheres, or semi-spheres between the opposed surfaces of the piston and pad to lessen the friction therebetween.

The embodiments of the present invention as applied to the disc brake of a car will be explained as follows, referring to FIGS. 3–8.

The disc brake is mounted to the car wheel 1 which rotates freely on hub 5. The hub is journaled through the medium of roller bearing 8 on the shaft 13 which is fixed to the steering knuckle 12. The wheel disc 3 and the brake disc 10 are fixed to the hub 5 by the bolts 9 and 4, respectively, FIG. 4.

The brake disc 70 is of hat-shape with a flat rim, or crown, and the rim of the disc is placed between two opposed brake friction pads 50 held within the caliper 30. The caliper is fixed to the knuckle 12 by bolt 14.

One end of the oil pressure pipe 20, whose other end is connected to the master cylinder (not shown) is connected to the caliper. A dust cover 11 for the brake disc 10 is provided on the steering knuckle 12.

The brake disc 10 rotates with the wheel 1, while the car is running, but when the brake pedal is pressed down by foot for stopping the car, the oil compressed within the master cylinder enters the cylinders within the caliper 30 through the pipe 20 and presses the pads 50 toward disc 10. The pads 50 are placed at both sides of the disc 10, so that the frictional force increases as the disc 10 is pressed by the pads, and, as a result, the car is stopped.

As thus far explained, the brake assembly is more-or-less conventional. FIGS. 5 to 8 show the first embodiment of the invention in which elongated cylindrical bearing members, or rollers, are placed between the pistons of the cylinders and the friction pads 50. The sidewalls 31, which hold, or form, the pressure fluid cylinders 90 at opposed sides of the rim of the brake disc 10, are fixed by bolts to the caliper 30 straddling the disc rim. The pressure fluid pipes 20 are fixed by nuts 21 to the sidewalls 31 to connect the pipes with the cylinders 90. Each cylinder 90 includes a piston 70 projecting partly out of the cylinder toward a back plate 51 fixed to the pad 50. The two rollers 60, parallel to each other, are inserted between the piston and the back plate 51. The center lines of the rollers are nearly along radial lines of disc 10.

The rollers 60 are positioned in a groove 78 with bottom wall 79 (FIG. 6) formed in the central part of the forward, outer surface of the piston 70. Groove 78 extends nearly to the lower end surface of the piston. The projections 76 (FIG. 7) are formed on the forward surface of the piston at each side of the groove 78. Each projection has a crosshead 77 for riding in a groove in the friction pad, as will be later explained. An automatic gap-regulating apparatus, having the spring 95 (FIG. 6) for pulling back the piston when the oil pressure is removed, (i.e., when braking is released) is positioned on the back side of the piston 70. Two circumferential grooves are provided in the cylindrical wall of piston 70 for retaining the O-rings 71 for sealing the pressure fluid. A rubber boot 32 is placed between the piston and the cylinder wall 31 to prevent leakage of pressure fluid, and to make the piston 70 move smoothly along the inside wall of the cylinder 90.

Back plate 51, formed of iron is fixed on the surface of pad 50 opposed to piston 70, and two grooves 53, each having an opening at the lower end thereof for loosely inserting the projection 76 of the piston, are formed on corresponding, or aligned, portions of the back plate 51. Pad 50 is formed with the pair of grooves 54 for loosely receiving the crosshead 77 of the projection 76, and these grooves communicate with grooves 53.

The inside walls 38 of caliper 30, at the front and rear positions in the rotating direction of brake disc 10, face the sidewalls of the pad 50 spaced therefrom by a very small gap, and when the pad 50 is moved in the rotating direction by being pressed against the brake disc, the pad wall crosses said gap and engages the caliper wall 38, which thus becomes the surface of reaction force. The lower plate 39, on which the pad 50 moves freely, is fixed to the lower end of caliper 30.

The pad 50 can be set and removed freely, and when it is to be set, the grooves 54 of the pad and grooves 53 of the back plate 51 are engaged with the projections 76 and the crossheads 77 of the piston 70, and the pad is pressed downward until the lower end thereof contacts the lower plate 39 so that the pad 50 is loosely fitted to the piston 70. A fixing part 34, (FIG. 6) is provided for preventing the upward escape of pad 50. Part 34 is of inverted U-shape in cross section, and is engaged over the bridge 33 set on the upper end of the central part at the sidewalls of caliper 30, to which it is fixed by bolt 36 and nut 35. Two outwardly bent portions 37 are formed at the free ends of said fixing part 34, and these are placed on the pads 50, thereby preventing the upward movement of the pads and their escape from the caliper.

Lubricating grease is applied to the two rollers 60. When pressure is applied to the oil within cylinder 90 during braking, the piston 70 presses the pad 50 through the rollers 60, and the pad 50 presses the brake disc 10. There being two friction pads, pressure is applied from both sides to suppress rotation of the disc. When braking pressure is released, the piston 70 is returned to its original position by the action of spring 95. Pad 50 is returned to its former position by the crossheads 77 of the piston engaged with the pad.

During braking, the force of the piston to press the pad vertically against the rotating surface of the brake disc 10 is transmitted through the two rollers 60, but the frictional force between the piston 70 and the pad 50 is very small since the rollers 60 are free to rotate, and since the piston and pad contact the rollers along lines only rather than large areas. As a result, very little frictional oscillation occurs between the pad 50 and disc 10. Moreover, the pad is almost free from bending oscillations and does not bring about elastic oscillations. Accordingly, the occurrence of brake squeal is almost perfectly prevented.

A second embodiment of the invention in which half rollers, or semi-cylinders, are used as the intermediate material between the piston and the pad, is shown in FIG. 9, which is a view corresponding to that of FIG. 7. In FIG. 9, the semi-cylinders 61 are placed in pairs parallel to the radial lines of disc 10, one at each side of the forward surface of the piston 70. These two half rollers are as long as the full rollers in the first embodiment and are placed at equal distance from the two sides of piston 70. The arcuate surfaces of the semi-cylinders engaged the opposed flat surface of the pad back plate 51. The flat surfaces of the semi-cylinders are fixed to the piston 70 by welding. One projecting pin 76 with crosshead 77, such as used in the first embodiment, is placed at the central part of the piston 70, rather than two at the sides, as in the first embodiment.

As in the first embodiment, the pin and crosshead 77 ride in the channels 53 and 54 of the back plate and pad, respectively.

Accordingly, during braking the parallel surfaces of piston 70 and pad 50 are stabilized and maintained parallel by the fixed half rollers; the frictional force between piston 70 and pad 50 is small, and pad 50 is freed from the possibility of bending oscillations. Therefore, brake squeal is prevented. Moreover, a half roller as an intermediate member can be inserted easily, and its manufacture and assembly is simple.

Figure 10:
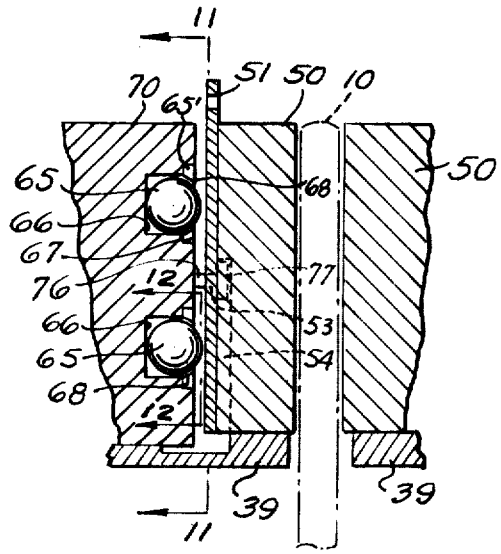
FIGS. 10 to 12 show the third embodiment of this invention.
Figure 12:
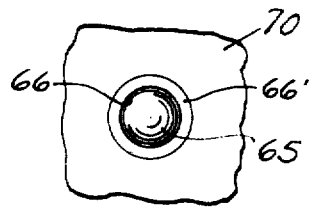
Figure 11:
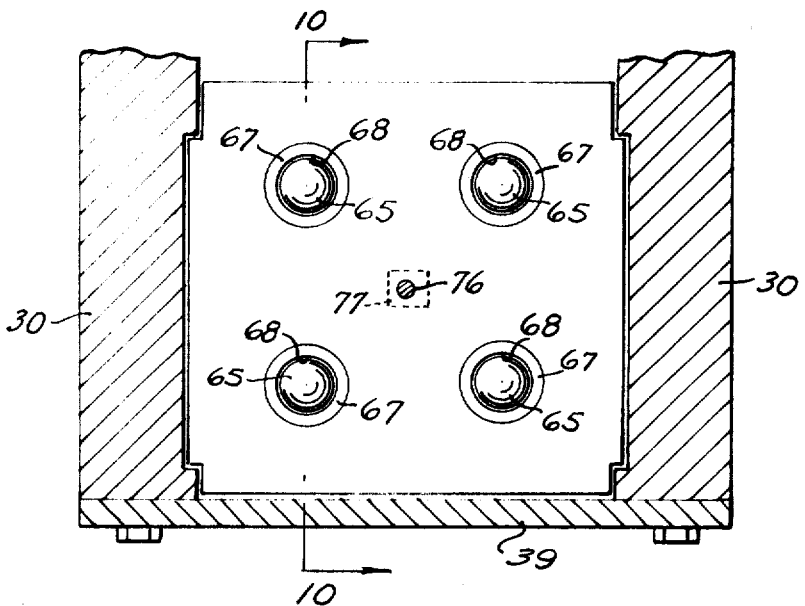

The third embodiment of the invention is illustrated in FIGS. 10 to 12. Four balls are used as the intermediate members between the piston and the friction pad. These balls 65 are inserted in and retained against escape from four recesses formed on the forward surface of piston 70. The balls are free to rotate. The recesses are cylindrical and of a depth slightly less than the diameter of the ball which it seats, and slightly larger in diameter. At its forward end each recess is enlarged as at 66 to receive frictionally and tightly a flat retaining ring 67 which holds the ball in the recess 66. The recesses are disposed at the corners of a square, or rectangle, whose center is coincident with that of the surface of the piston. The central hole 68 in each retainer ring 67 has a diameter smaller than that of ball 65. Each ball is movable in its recess 66 as there is clearance between the ball and the sidewall of the recess, or between the ball 65 and the hole 68 of the retainer 67. Since the depth of the recess 66 is shorter than the diameter of the ball 65, the surface of each ball projects a little beyond the forward surface of the piston.

A projecting pin 76 and crosshead 77 are provided centrally of the piston for loosely securing the pad 50 as described previously in relation to the other embodiments.

During braking, the force of piston 7 pressing pad 50 to the rotating surface of the brake disc 10 is applied through the four balls 65 causing the balls to roll in all directions within the recesses 66, so that the frictional force between the piston and the pad is very small compared with even the first two embodiments of the invention. The contact between the piston 70 and pad 50 is only point contact with each of the four balls, so that practically no frictional oscillations take place between the pad 50 and disc 10. The pad 50 is almost free from bending oscillations, and does not cause elastic oscillations, so that brake squeal is prevented almost perfectly.

In the third embodiment, four balls are used in order to stabilize and maintain the opposed surfaces of piston 70 and pad 50 in parallel condition, but three balls arranged in such a way that they are not on the same straight line, or five, or more balls may be used for the same purpose.

The intermediate members of the invention are not restricted to the rollers, half rollers and balls as described above, but these are examples and any members having arc-like surfaces such as pipe-like rollers, half-pipes, semi-spheres, and springs with arc form can be used. These members may be inserted into recesses on one or both of the opposed surfaces of the piston and pad, or they may be held by supporting means provided between the piston and the pad, so that their arc-like surfaces are contacted by one, or both, of the opposed surfaces of the piston and friction pad at points, or along lines.

The intermediate members are placed in such manner that the opposed surfaces of the pad and piston may be maintained almost parallel; for instance, they can be placed at two positions on the central part of the opposed surface, or three positions on the central part and near the upper and lower edges, or various other positions. It is also possible to use the above-mentioned intermediate members in combination, for instance, a roller and a ball at the same time.

The prevention of brake squeal can be realized very effectively especially when the intermediate members are placed in such manner that the central part of the friction pad receives the pressing force of the piston.

Moreover, in this invention the prevention of brake squeal is realized by a very simple treatment on one, or both off the opposed surfaces of the piston and the friction pad; the manufacture and assembly is very simple treatment and, further, the invention can be easily applied to the conventional disc brakes.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

We claim:

1. A disc brake comprising a rotatable disc, a caliper straddling a portion of the periphery of the disc, at least one axially movable piston in the caliper operated by fluid pressure, a pad of friction material held against substantial radial and circumferential movement within the caliper and pressed against the disc by said piston, and at least one cylindrical roller supported rotatably in at least one groove provided on one of the opposed surface of said piston and pad, said roller having an axial extent greater than one half the radial extent of the pad and having its longitudinal axis parallel to a radius of the disc, so that the arcuate surface of said roller contacts the opposed surfaces of said piston and pad, to reduce the friction between the pad and the piston in a direction perpendicular to the axis of said roller, to thus prevent torsional vibration and eliminate brake squeal.

2. A disc brake according to claim 1, wherein said groove is provided in the surface of said piston opposed to said pad.

3. A disc brake according to claim 1, wherein said groove is provided in the surface of said pad opposed to said piston.

4. A disc brake according to claim 1, wherein said groove has a depth smaller than the diameter of said cylindrical roller.

5. A disc brake according to claim 1, wherein said cylindrical roller is a solid roller.

6. A disc brake according to claim 1, wherein said cylindrical roller is a hollow roller.

7. A disc brake according to claim 1, wherein a plurality of said rollers are positioned between said piston and pad, the axis of said rollers being parallel to each other.

* * * * *